US009549282B1

(12) United States Patent
McDonough et al.

(10) Patent No.: US 9,549,282 B1
(45) Date of Patent: Jan. 17, 2017

(54) VERIFICATION OF WIRELESS TRANSMITTER ARTICLES IN PROXIMITY TO REGISTERED DEVICES

(71) Applicant: FMR LLC, Boston, MA (US)

(72) Inventors: Suzanne K McDonough, Boston, MA (US); Ashley Reichert, Boston, MA (US); John McDonough, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/801,678

(22) Filed: Jul. 16, 2015

(51) Int. Cl.
*H04W 4/00* (2009.01)
*H04W 4/02* (2009.01)
*H04L 29/08* (2006.01)

(52) U.S. Cl.
CPC ............ *H04W 4/008* (2013.01); *H04L 67/306* (2013.01); *H04W 4/021* (2013.01); *H04W 4/023* (2013.01)

(58) Field of Classification Search
CPC ...... H04W 4/008; H04W 4/021; H04W 4/023; H04W 4/025; H04B 7/18556; H04B 5/0025; H04L 67/306
See application file for complete search history.

(56) References Cited

U.S. PATENT DOCUMENTS

| 6,463,290 | B1 * | 10/2002 | Stilp | G01S 5/02 |
| | | | | 455/456.1 |
| 2004/0203884 | A1 * | 10/2004 | McCalmont | H04W 4/02 |
| | | | | 455/456.1 |
| 2007/0145113 | A1 * | 6/2007 | Keller | G06K 17/00 |
| | | | | 235/377 |
| 2013/0109345 | A1 * | 5/2013 | Edge | H04Q 3/0045 |
| | | | | 455/404.2 |
| 2014/0155090 | A1 * | 6/2014 | Khorashadi | H04W 4/04 |
| | | | | 455/456.2 |
| 2014/0257889 | A1 * | 9/2014 | Ashley, Jr. | G06Q 10/063 |
| | | | | 705/7.11 |
| 2015/0094102 | A1 * | 4/2015 | Jung | H04W 24/02 |
| | | | | 455/456.6 |
| 2015/0356860 | A1 * | 12/2015 | Robichaud | G08B 25/10 |
| | | | | 340/539.13 |
| 2016/0028554 | A1 * | 1/2016 | Lea | H04L 12/189 |
| | | | | 370/312 |

* cited by examiner

*Primary Examiner* — Andrew Wendell
(74) *Attorney, Agent, or Firm* — Proskauer Rose LLP

(57) ABSTRACT

A computer-implemented method includes receiving a user identifier from a wireless tracking device that reads a user identifier article in proximity to the wireless tracking device; identifying a geographic location of the wireless tracking device; performing a look-up of a client device of the user; identifying first and second wireless routers that are positioned in the identified geographic location; transmitting, to the first router, a first request message to transmit to the client device of the user; transmitting, to the second router, a second request message to transmit to the client device; receiving, by the one or more computers from the first and second routers, reply messages transmitted by the client device; determining a geographic location of the client device; and verifying, based on the geographic location of the client device and the geographic location of the reader, that the user is in proximity to the client device.

25 Claims, 7 Drawing Sheets

VERIFICATION OF WIRELESS TRANSMITTER ARTICLES IN PROXIMITY TO REGISTERED DEVICES

BACKGROUND

Near field communication (NFC) is the set of protocols that enables smartphones and other devices to establish radio communication with each other by touching the devices together or bringing them into proximity to a distance of typically 10 cm (3.9 in) or less.

SUMMARY

A computer-implemented method includes receiving a user identifier by one or more computing systems from a wireless tracking device that reads a user identifier article in proximity to the wireless tracking device; identifying by the one or more computers a geographic location of the wireless tracking device that transmitted the user identifier; performing by the one or more computers a look-up of a client device of the user; identifying by the one or more computers first and second wireless routers that are positioned in the identified geographic location; transmitting, by the one or more computing systems to the first router, a first request message to transmit to the client device of the user; transmitting, by the one or more computing systems to the second router, a second request message to transmit to the client device; receiving, by the one or more computers from the first and second routers, reply messages transmitted by the client device; based on contents of the reply messages, determining a geographic location of the client device; and verifying, based on the geographic location of the client device and the geographic location of the reader, that the user is in proximity to the client device. A system of one or more computers can be configured to perform particular operations or actions by virtue of having software, firmware, hardware, or a combination of them installed on the system that in operation causes or cause the system to perform the actions. One or more computer programs (and/or one or more machine-readable hardware storage devices) can be configured to perform particular operations or actions by virtue of including instructions that, when executed by data processing apparatus, cause the apparatus to perform the actions.

The actions include when the client device is not in a communication range of the first and second routers, determining an absence of receipt of the reply messages; based on the absence of receipt of the reply messages, determining that the user and the client device are in different geographic locations. The actions include based on the contents of the reply messages, performing a triangulation process to determine the geographic location of the client device. The actions include notifying the user of an occurrence of an event in a geographic location of the reader or the client device by transmitting to the client device a message with information indicative of the event. The actions include comparing the geographic location of the client device to the geographic location of the reader; and determining, based on the comparing, a correspondence between the geographic locations. The user identifier is a near-field communication (NFC) code, and wherein the method further comprises: registering the NFC code with the one or more computer systems; associating the NFC code with a personal profile of the user to enable identification of the user via the NFC code. The actions include retrieving, from a data repository, personal profile information for the user; and generating information for a graphical user interface that when rendered on a display device renders a visual representation of a geographic location of the user and at least a portion of the personal profile information. The actions include receiving a notice of an event having occurred in a particular geographic location, with the geographic location comprising a plurality of different areas; determining, based on received first user identifiers, one or more first users who are located in a first area of the particular geographic location; determining, based on received second user identifiers, one or more second users who are located in a second area of the particular geographic location; determining that the one or more first users are a high priority than the one or more second users, at least partially based on the one or more first users being a particular user type or based on the first area in which the one or more first users are located; generating a queue in which information representing the one or more first users is ranked above information representing the one or more second users; and performing one or more actions related to the first and second users, with an order in which the actions are performed being in accordance with a ranking of the first and second users specified by the queue. The actions include determining, based on received user identifiers, a number of users in a particular location; and computing, based on the received number of users, a utilization metric for the particular location. The particular location is a conference room in a building and wherein the utilization metric specifies an appropriate temperature for the conference room to ensure the users utilize an appropriate amount of air conditioning.

DETAILED DESCRIPTION

Figure 1:
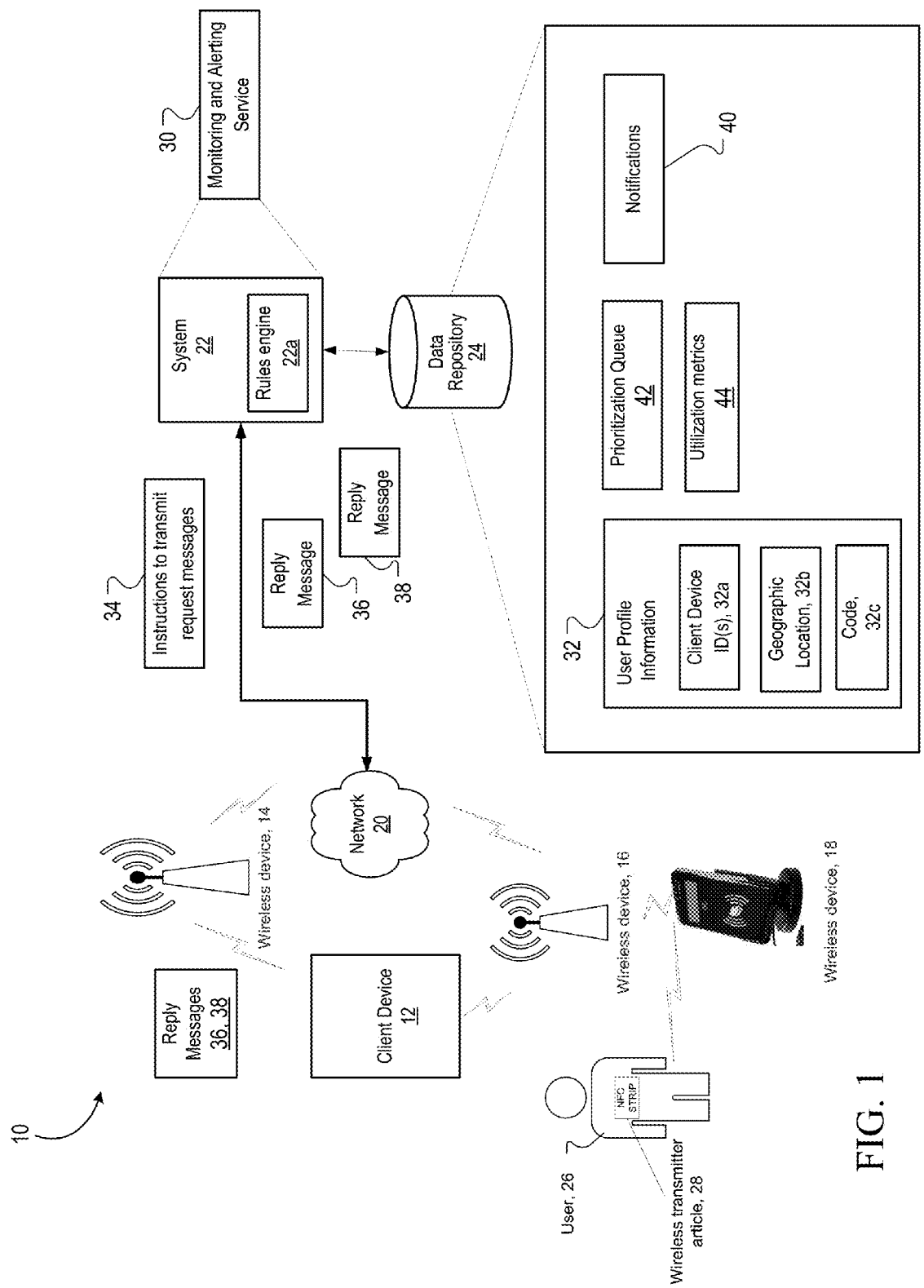
FIGS. 1-3 are block diagrams of a system for verifying that wireless transmitter articles are in proximity to registered devices.

Referring to FIG. 1, networked system 10 includes client device 12, wireless devices 14, 16, 18, network 20, system 22 and data repository 24. Client device 12 is associated with user 26, when user 26 is using client device 12. User 26 is also associated with wireless transmitter article 28, such as a Near Field Communication (NFC) strip that is embedded into a piece of clothing worn by user 26 or is part of a badge carried by user 26. Wireless transmitter article 28 is encoded with code 32c (e.g., a NFC code) that is unique to user 26 and is registered in a user profile 32. There are various types of wireless transmitter articles, such as a user identifier article such as a badge. Wireless devices 14, 16 include Wi-Fi routers, Wi-Fi access points, wireless tracking devices, beacons, computing devices, laptops and so forth. Wireless devices 14, 16 communicate via network 20 to system 22 and also communicate with client device 12 and wireless transmitter article 28. In some examples, wireless devices 14, 16 are fixed location wireless devices, such as fixed location routers or computers. In other examples, wireless devices 14, 16 are discoverable (e.g., by system 22), when one or more of wireless devices 14, 16 are connected to a network or connected to a port.

Wireless tracking devices, such as wireless device 18, include a NFC reader or other type of scanner that reads (intermittently or continuously) information embedded in wireless transmitter articles, radio-frequency identification (RFID) tags, NFC strips, and so forth. As user 26 enters the communication range of wireless device 18, wireless transmitter article 28 sends one or more signals to wireless device 18, with the transmitted signals encoding code 32c. Wireless transmitter article 28 is configured in various ways, including being configured to intermittently transmit signals (such that wireless device 18 receives these signals when wireless transmitter article 28 is in proximity to wireless device 18) or being configured to receive messages from wireless device 18 that prompt wireless transmitter article 28 to transmit code 32c to wireless device 18.

System 22 is a system for tracking numbers of users in various geographic locations and for determining various actions to perform based on the tracked users. System 22 also computes metrics that are relevant to a geographic location in which a tracked number of users are located. System 22 includes rules engine 22a for implementing various rules to identify which actions are implemented and other rules to compute the various metrics. System 22 also includes monitoring and alerting service 30 for monitoring numbers and types of users in various locations and for alerting users of various events that are detected in those locations.

To track user 26, data repository 24 stores user profile 32 of the user 26. User profile 32 includes client device identifiers (IDs) 32a. A client device ID specifies a string of characters that uniquely identify a client device, such as a mobile device. When user 26 becomes a user of networked system 10, user 26 registers with system 22. As part of the registration process, system 22 generates a user profile that is stored in data repository as user profile 32. The system registers user 26 with wireless transmitter article 28. As part of this registration, system 22 stores in data repository 24 code 32c that is associated with or encoded into wireless transmitter article 28. As another part of the registration process, user 26 registers client device 12 (thus making client device 12 a registered device) with system 22 by specifying a unique identifier (e.g., a media access control (MAC)) of client device 12. This unique identifier is stored in data repository 24 as client device ID 32a as part of user profile 32. As system 22 tracks the location of user 26 (via wireless transmitter article 28), system 22 updates user profile 32 with geographic location information 32b which specifies the geographic location (including geographic height) of user 26 (e.g., user 26 is in the main corporate headquarters, on the 4$^{th}$ floor, in the Pine conference room). To increase the granularity with which system 22 tracks the location of a user, wireless readers and scanners, such as wireless device 18, are located at a large number of locations throughout a facility or particular geographic location. In a system with a high level of granularity, these readers and scanners are placed in every room and in multiple locations throughout a room.

As user 26 enters a communication range of wireless device 18, wireless transmitter article 28 (which is held by user 26 or affixed to user 26) transmits to wireless device 18 code 32c (or an encoded version of code 32c). Wireless transmitter article 28 transmits code 32c, because wireless transmitter article 28 is configured to periodically transmit code 32c or because wireless device 18 is sending out messages requesting information and codes from devices that are within a communication range of wireless device. Wireless device 18 receives code 32c and, in response, transmits code 32c to system 22. Along with code 32c, wireless device 18 also transmits an identifier of wireless device 18 itself. Upon receiving code 32c and the identifier of wireless device 18, system 22 performs two lookups in data repository 24. Using received code 32c, system 22 identifies user profile 32 that is associated with code 32c. Using the received identifier of wireless device 18, system 22 looks-up in a lookup table, a geographic location associated with that identifier to determine a geographic location of wireless device 18 and user 26 associated with the received code 32c. Table 1 below shows an illustrative example of what would be included in such a lookup table.

TABLE 1

| Wireless Device Identifier | Geographic Location |
| --- | --- |
| 034543xc4 | Pine Conference Room, 76 Emerald St, Boise, Idaho |

In Table 1, wireless device 18 is associated with an identifier "034543xc4." Data repository 24 stores a mapping of data records specifying wireless device identifiers to other data records including information specifying various geographic locations, as shown in Table 1 above. The identifier of wireless device 18 specifies that wireless device 18 is in a geographic location of "Pine Conference Room, 76 Emerald St, Boise, Id." Using Table 1 (or data records representing Table 1), system 22 looks-up the geographic location of wireless device 18, based on the identifier of wireless device 18, and determines that user 26 is in this geographic location (because wireless device 18 read code 32c from wireless transmitter article 28 of user 26). Based on the identified user profile 32 and the determined geographic location of user 26, system 22 updates or generates geographic location information 32b with information specifying the geographic location associated with wireless transmitter article 28. Geographic location information 32b also includes a timestamp to specify the time at which user 26 was in communication range of wireless device 18.

Responsive to receipt of code 32c (or information indicative of code 32c), system 22 determines whether user 26 is in proximity to client device 12 of user 26. System 22 makes this determination to determine a likelihood of user 26 receiving a message (e.g., an email message) or other notification, if system 22 sends such a notification to user 26. To determine whether user 26 is in proximity to client device 12, system 22 identifies which client devices are associated with user 26 by looking-up in user profile 32 client device IDs 32a, which uniquely identify which client devices are registered to user 26. Based on client device IDs 32a, system 22 identifies a client device ID for client device 12. System 22 also identifies via a look-up table, such as Table 2 below, which routers or other wireless devices are positioned in the geographic location in which user 26 is located.

| Geographic Location | Latitude and Longitude Coordinates | Wireless Device Identifier |
| --- | --- | --- |
| Stelwart Building, Pine Conference Room, 76 Emerald St, Boise, Idaho | 41.508577; −72.597656 | Router 23543A |

| Geographic Location | Latitude and Longitude Coordinates | Wireless Device Identifier |
| --- | --- | --- |
| Stelwart Building, Pine Conference Room, 76 Emerald St, Boise, Idaho | 41.508577; −72.597656 | Router 23543H |

Table 2

As shown in the above Table 2, there are two routers associated with the geographic location of "Pine Conference Room, 76 Emerald St, Boise, Id." These routers are wireless devices 14, 16 with device IDs of 23543A, 23543H, respectively. As also shown above, Table 2 specifies the exact location of a wireless device via latitude and longitude coordinates. System 22 performs of lookup in Table 2 (or in database records representing Table 2) of which device IDs are associated with a particular geographic location, i.e., the geographic location associated with device ID 034543xc4 of wireless device 18, namely, the geographic location of Pine Conference Room, 76 Emerald St, Boise, Id. Based on the look-up, system 22 identifies wireless devices 14, 16 with device IDs of 23543A, 23543H as being in this geographic location. System 22 transmits instructions 34 to wireless devices 14, 16 that are identified based on device IDs of 23543A, 23543H, respectively. Instructions 34 are instructions to transmit request messages (such as echo request messages) to client device 12 or to client devices in a communication range. When instructions 34 are specific instructions to transmit a message to client device 12, instructions 34 also include client device ID 32a for client device 12 or include information on how to communicate with client device 12. When instructions 34 do not include client device ID 32a or information for contacting client device 12, instructions 34 instruct a wireless device to broadcast a request message to devices within a communication range of the wireless device.

Wireless devices 14, 16 each receive instructions 34. In response, wireless devices 14, 16 each transmit a request message (not shown) to client device 12 or generally broadcast messages to client devices within a communication range. When client device 12 is in a communication range of wireless devices 14, 16, client device 12 receives the request message(s) and, in response, replies with reply messages 36, 38 (e.g., an echo reply message). Client device 12 receives the request message and transmits reply messages 36, 38 to wireless devices 14, 16, respectively. Wireless devices 14, 16 forward reply messages 36, 38 to system 22. A reply message includes information specifying an amount of time it took the client device to respond to the request message and an ID of the client device transmitting the reply message. A wireless device may add to the reply message by updating it to include the device ID of the wireless device, to enable system 22 to identify which wireless devices received which reply messages.

Based on contents of reply messages 36, 38, system 22 determines a geographic location of client device 12. There are various ways in which system 22 determines the geographic location, including determining a geographic location associated with the device ID included in the reply message via Table 2. System 22 also determines a location of client device 22 by implementing a triangulation process to triangulate a location of client device 12, based on the amount of time it took client device 12 to respond to the request message and based on the latitude and longitude of the wireless device receiving the reply message. Based on these time amounts, system 22 determines the relative distances between client device and the wireless devices. System 22 uses contents of Table 2 to look-up the latitude and longitude coordinates of a particular wireless device, based on device identifier. Using triangulation and the latitude and longitude coordinates of the wireless devices receiving the reply message, system 22 identifies longitude and latitude coordinates of client device 12. System 22 obtains the geographic location of client device 12 by looking-up in another table (not shown) which geographic location includes those identified coordinates.

Upon receipt of reply messages 36, 38, system 22 also confirms that the client device ID included in the reply message matches client device ID 32a of client device 12 for which system 22 is confirming location. Upon detection of a mismatch, system 22 discards the reply message and identifies whether other reply messages have been received with matching client device IDs. System 22 also confirms whether the reply message includes the wireless device ID for one of the wireless devices that were sent instructions 34. If the reply message includes a mismatched wireless device ID, system 22 identifies that a wireless device, other than one of the ones originally instructed, received the reply message. Based on this reply message, system 22 determines that client device 12 is in a different location from the location of wireless device 18, when the wireless device transmitting the reply message and the wireless device 18 are in different geographic locations.

Based on the geographic location of client device 12 and the geographic location of wireless device 18 (which is a wireless tracking device), system 22 verifies whether user 26 is in proximity to client device 12. System 22 verifies that user 26 is in proximity to client device 12 when there is a match or other correspondence between the geographic location of client device 12 and the geographic location of wireless device 18. When system 22 verifies that user 26 is in proximity to client device 12, system 22 enables sending of notifications to client device 12. When system 22 is unable to verify that user 26 is in proximity to client device 12, system 22 restricts or prevents sending of notifications to client device 12. System 22 is unable to verify that user 26 is in proximity to client device 12, when system 22 fails to receive reply messages including client device ID 32a for client device 12, fails to receive reply messages at all, fails to receive reply messages including devices IDs of at least wireless devices 14, 16, and so forth. System 22 implements monitoring and alerting service 30 to receive reply messages and to parse the reply messages to verify whether a geographic location of client device 12 matches a geographic location of wireless device 18.

Upon verifying the proximity of client device 12 to wireless device 18, system 22 implements rules engine 22a to generate various notifications 40 to be transmitted to client device 12. System 22 tracks occurrences of events (such as system malfunctions, power outages, fire alarms, and so forth) in the various locations, e.g., by having various sensors in the geographic locations to track these occurrences and report them to system 22. Upon identification of an event, system 22 identifies a geographic location of the event and which users are in proximity to that event, by identifying wireless transmitters of users that have been read by readers in that geographic location. System 22 also identifies which of these users are also in proximity to their client devices. For the users that are in proximity to their client devices, system 22 transmits to these client devices (including client device 12) notifications 40 with information indicative of the event. Rules engine 22a includes rules on which types of notifications to transmit for which types of occurrences and other rules specifying which types of occurrences are not associated with notifications. For some types of occurrences, rules engine 22a specifies that a threshold number of people need to be at the location of the occurrence, before notifications are transmitted. For some other types of occurrences, rules engine 22a specifies that a certain type of users (e.g., high-level executives) or a threshold number of certain types of executives need be at the location before notifications are transmitted. Rules engine 22a also includes rules that specify which actions to implement and/or an order in which to execute actions, based on numbers and/or types of users in various portion of a geographic location. For example, if the detected event is a fire alarm, rules engine 22a includes a rule that users on the higher level floors of a building are evacuated first, before users in lower level floors of the building. Rules engine 22a implements this rule by determining numbers of users on each of the floors and generating a notification (to the fire department) that specifies the number of users on each of the floors and instructions to evacuate the top floors first. Rules engine 22a implements the techniques described herein in tracking the users and the locations of the users.

In generating notifications 40 or identifying actions, system 22 generates prioritization queue 42, which specifies a priority in which to transmit notifications or perform actions. System 22 receives a notice of an event having occurred in a particular geographic location, with the geographic location comprising a plurality of different areas. System 22 determines, based on received first user identifiers (e.g., code 32c), one or more first users who are located in a first area of the particular geographic location. System 22 also determines, based on received second user identifiers, one or more second users who are located in a second area of the particular geographic location. System 22 determines that the one or more first users are a higher priority than the one or more second users, at least partially based on the one or more first users being a particular user type (e.g., being a child or handicapped user) or based on the first area in which the one or more first users are located (e.g., being in a more dangerous portion of a building or in a higher floor). System 22 generates prioritization queue 42 in which information representing the one or more first users is ranked above information representing the one or more second users. System 22 performs one or more actions related to the first and second users (e.g., such as sending out notifications), with an order in which the actions are performed being in accordance with a ranking of the first and second users specified by the queue.

Upon detection of an event, system 22 also generates (e.g., for a system administrator) information for a graphical user interface that when rendered on a display device renders a visual representation the users who are located at a geographic location of the event and at least a portion of the personal profile information for the users. This graphical user interface is generated based on retrieving, from data repository 24, user profile information for the users—to enable the system administrator to identify how many users are at the geographic location and information about the users.

As user 26 moves around various geographic locations, wireless transmitter article 28 is intermittently scanned by new, different wireless devices and scanners. These wireless devices and scanners pass information back to system 22 to notify system 22 of the change in the geographic location of the user. System 22 re-implements the foregoing processes to confirm that user 26 is still in proximity to client device 12, i.e., that user 26 has moved with client device 12.

System 22 also generates utilization metrics 44, which specify how much of a resource (e.g., a power resource—such as air conditioning) is being consumed or how much of a recourse is appropriate to be consumed. System 22 computes these utilization metrics 44, based on a tracked number of users in a particular geographic location. Rule engine 22a also includes rules specifying appropriate consumption amounts or utilization metrics, for various numbers of tracked users and for the particular resource being utilized. For example, a particular location is a conference room in a building and the utilization metric specifies an appropriate temperature for the conference room to ensure the users utilize an appropriate amount of air conditioning.

In a variation of FIG. 1, rather than user 26 carrying wireless transmitter article 28, user 26 has a mobile device or other client device that displays a code (such as a quick response (QR) code). User 26 scans the code into a scanner or reader, to enable system 22 to identify a location of user 26.

Figure 2:
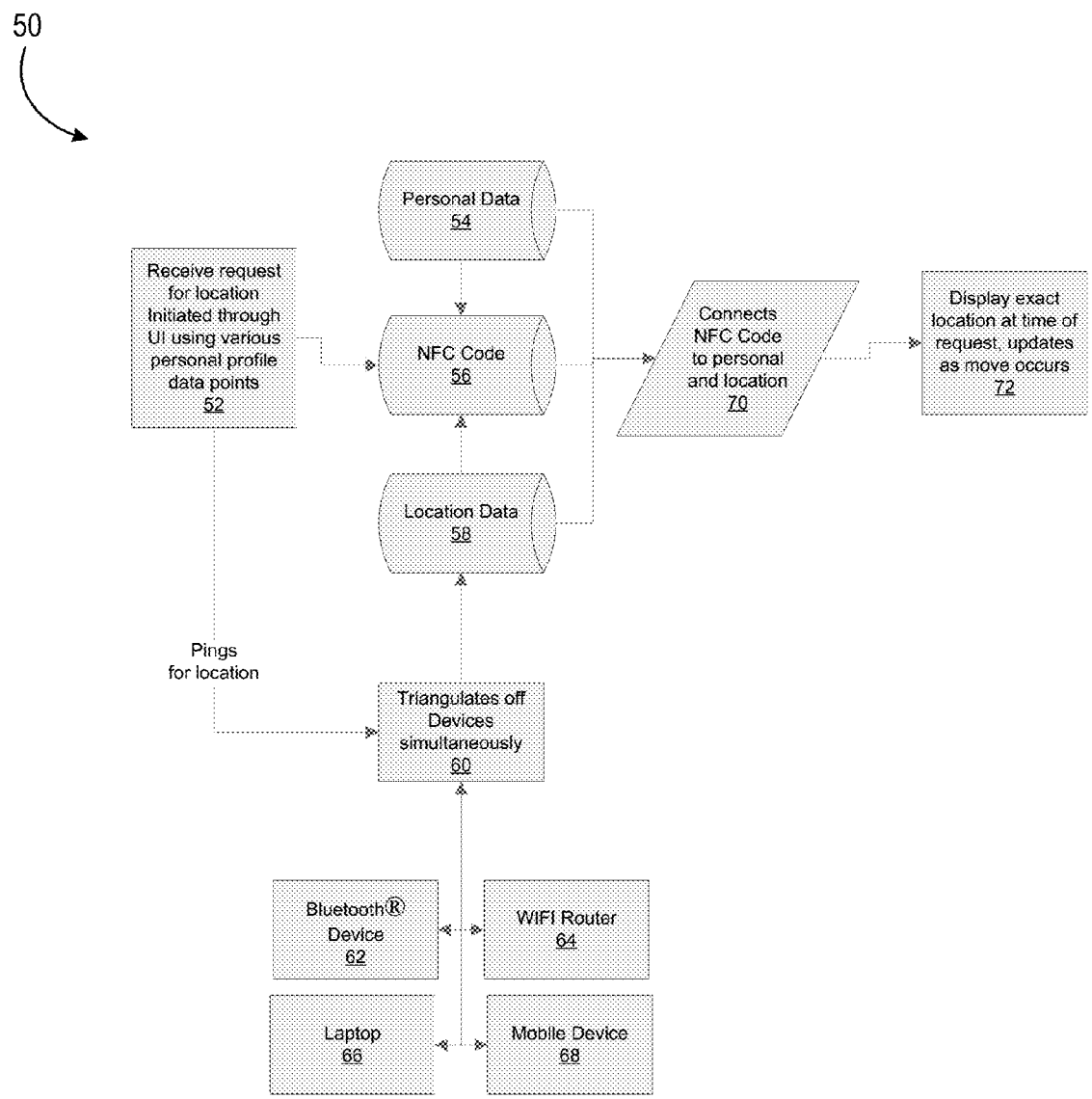

Referring to FIG. 2, system 22 implements process 50 in tracking a location of a user. In operation, system 22 receives (52) a request for a location of a user. This request is initiated (e.g., by an administrator) through a user interface (UI) using various personal data points, such as user's name, user identification number, a user's department, and so forth. The UI allows another user, such as the administrator, to enter the personal data points and to transmit the request. In response, system 22 identifies a client device associated with the tracked user (via the user's profile) and pings wireless devices 62, 64, 66, 68 for the location of the client device. The pinged wireless devices include fixed devices that are unassociated with the user, such as Wi-Fi Router 64. Other pinged wireless devices are wireless devices associated with the tracked user or with other users. These devices include Bluetooth® devices 62, laptops 66 and mobile device 68. System 22 is able to ping wireless devices of other users, when those devices have an installed application or other software (such as a GPS tracking software) that communicates a geographic location of the device to system 22. System 22 pings all wireless devices associated with system 22 or a subset of the wireless devices, i.e., those wireless devices in known proximity to user (i.e., in known proximity to a scanner that read the NFC code of the tracked user). Based on the geographic location of the scanner that read the NFC code of the tracked user, system 22 determines other wireless devices that are in proximity to the scanner, e.g., based on GPS location information passed from the other devices back to system 22. System 22 is able to communicate with these other wireless devices and transmits them instructions to send request messages.

In response to data and reply messages received from two or more of devices 62, 64, 66, 68, system 22 (FIG. 1) triangulates (60) off these devices (i.e., simultaneously) to determine a geographic location of the client device of the tracked user. System 22 stores, in data repository 24 (FIG. 1), location data 58, which includes information specifying the geographic location of the tracked user. System also retrieves NFC code 56 from data repository 24 (FIG. 1). As previously described, a profile of the tracked user may include NFC code 56. Using NFC code 56 or other identifying information of the user (such as a user ID), system 22 retrieves personal data 54 (e.g., a user profile) from data repository 24 or another data repository. Personal data 54 for a particular user is stored in association with a NFC code for that user, to enable retrieval based on a NFC code. System 22 connects (70) the NFC code to the personal data and the location data, e.g., by generating associations among the NFC code, the personal data and the location data. System 22 generates data for a graphical user interface that displays (72) an exaction location at the time of the request (along with personal data for the tracked user). System 22 updates the graphical user interface as the tracked user moves or changes locations. System 22 detects new and updated locations of the user, e.g., based on new scanner reads (e.g., in new geographic locations) of the NFC code of the user.

Figure 3:
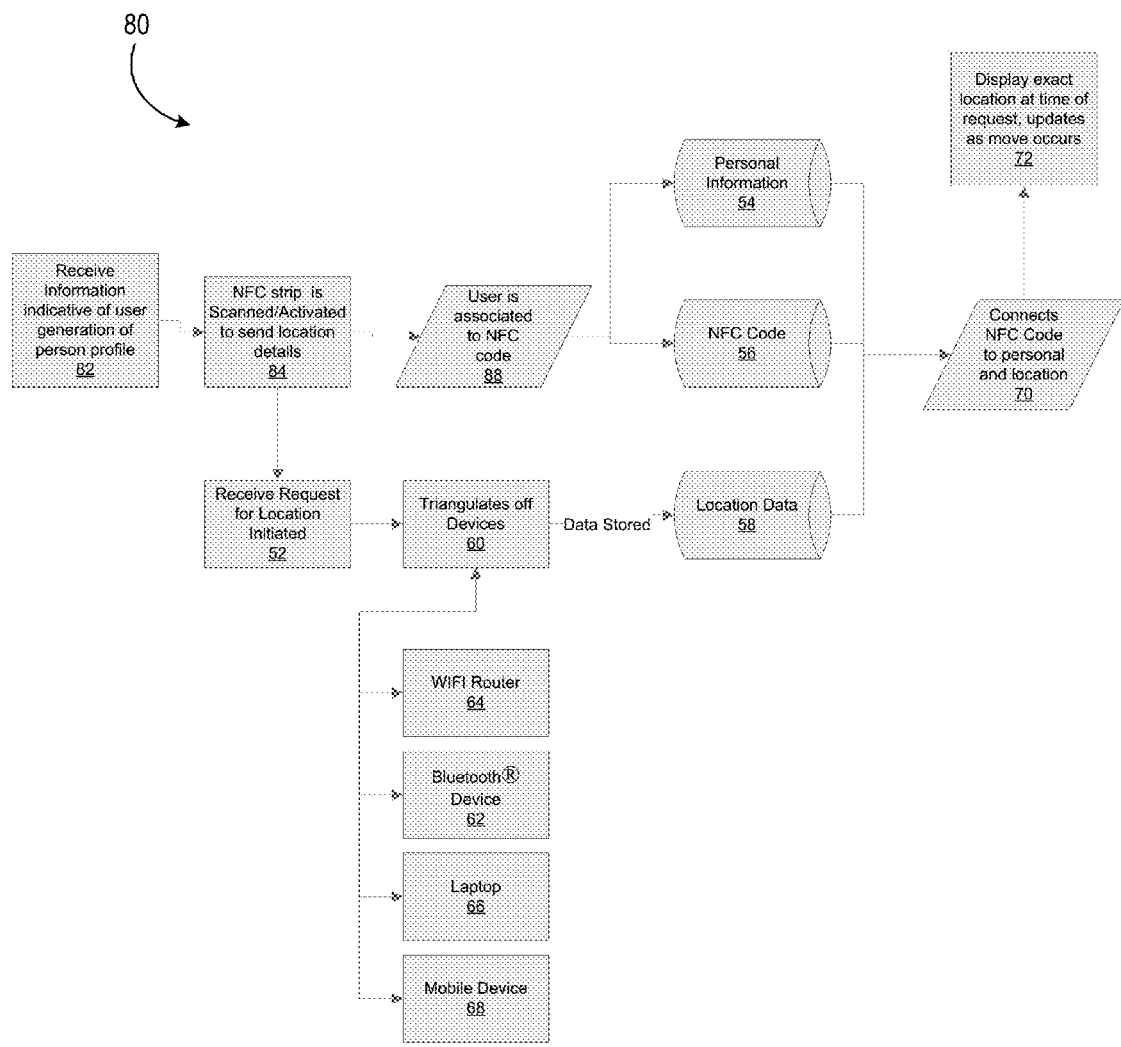

Referring to FIG. 3, system 22 implements process 80 in registering a user with a new NFC code and in identifying a location of the user, as the user moves around a facility. In operation, the user generates a user profile. System 22 receives (82) information indicative of the user generation of the personal profile. This received information includes a code that is uniquely associated with the user, such as NFC code or another code that is embedded into a wireless device. System 22 (or another device in communication with system 22) scans (84) a NFC strip that is embedded with the NFC code to activate the NFC strip to enable transmission to system 22 of information indicative of the geographic location of NFC strip, when it is scanned. System 22 also associates (88) the NFC code with the user, e.g., by generating an association between database records representing the user (i.e., the user profile) and other database records including the NFC code. Following the NFC strip being activated, system 22 executes one or more of operations 52, 60, 70, 72, using devices 62, 64, 66, 68 and information 54, 56, 58.

Figure 4:
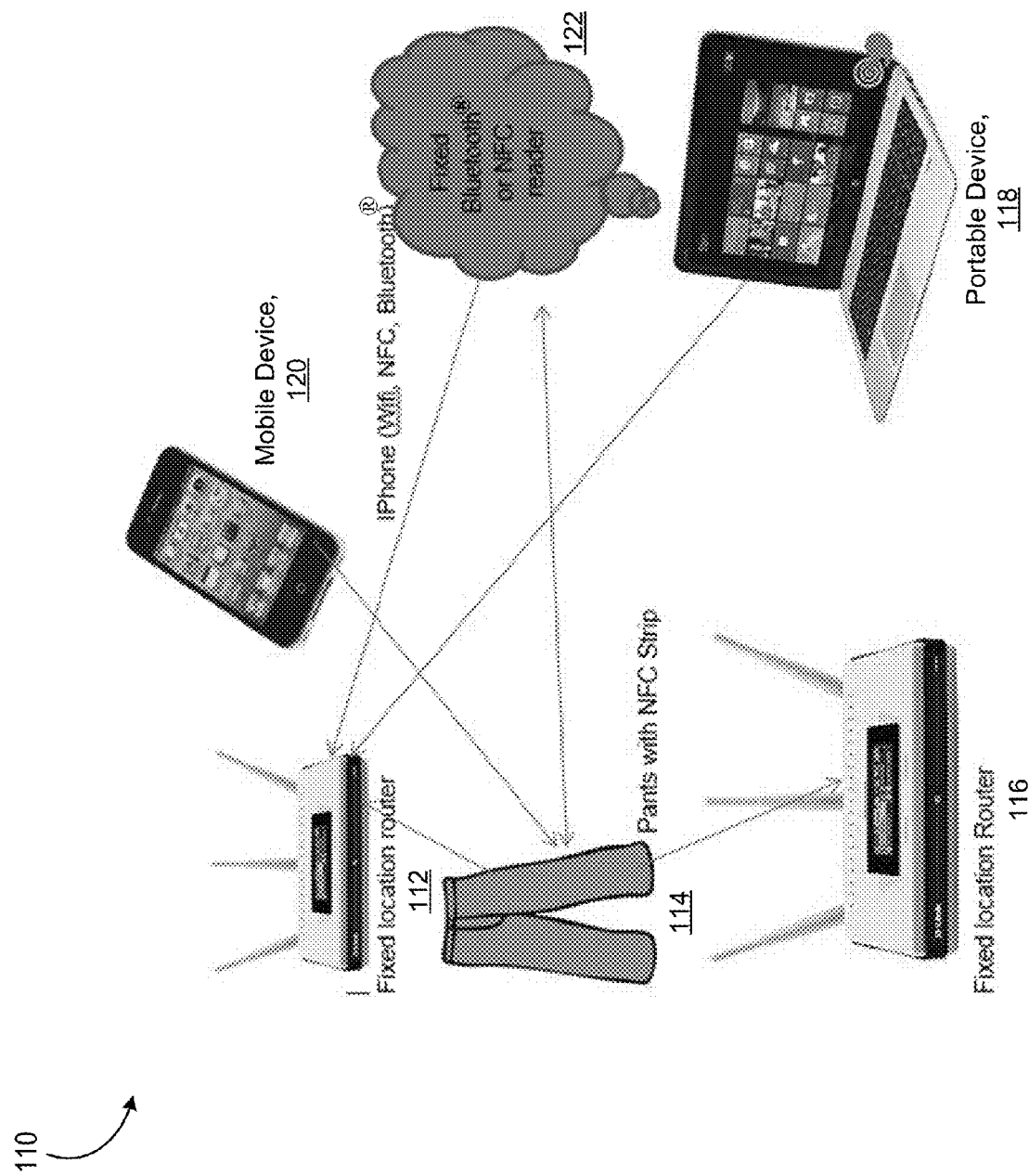
FIG. 4 is a diagram of devices for verifying that wireless transmitter articles are in proximity to registered devices.

Referring to FIG. 4, networked environment 110 enables the tracking of a user with pre-existing hardware in a building of facility and with client devices of the user. The tracked user wears pants with NFC strip 114. The tracked user also carries portable device 118 and mobile device 120. Networked environment 110 includes fixed location routers 112, 116 that are "fixed," because they are located in a specific location—independent of the tracked user or of movement of the tracked user. Networked environment 110 also includes fixed reader 122, such as a Bluetooth® or NFC reader. Portable device 118 is Wi-Fi enabled and communicates with one or more of fixed location routers 112, 116, which are Wi-Fi routers. Mobile device 120 is Wi-Fi enabled, NFC enabled and Bluetooth® enabled.

As user walks or otherwise moves past fixed reader 122, fixed reader 122 reads the NFC code embedded in NFC strip 114. Fixed reader 122 transmits the NFC code to system 22, via fixed location router 112. In response, system 22 transmits messages to one or more of portable device 118 and mobile device 120 via fixed location routers 112, 114. System 22 looks-up IDs of client devices associated with the tracked user (i.e., the user identified by NFC code 114). The tracked user carries mobile device 120 in the pants of the tracked user. Upon receipt of the request message, mobile device 120 transmits reply messages to fixed location routers 112, 114 for routing to system 22. Based on contents of the reply messages, system 22 performs a triangulation process to determine a geographic location of mobile device 120 and to determine whether the tracked user is proximity to mobile device 120. Upon receipt of the request message, portable device 118 transmits a reply message to router 112. System 22 also uses the contents of this message to triangulate a location of portable device 118 and to confirm whether portable device is in proximity to the user.

Figure 5:
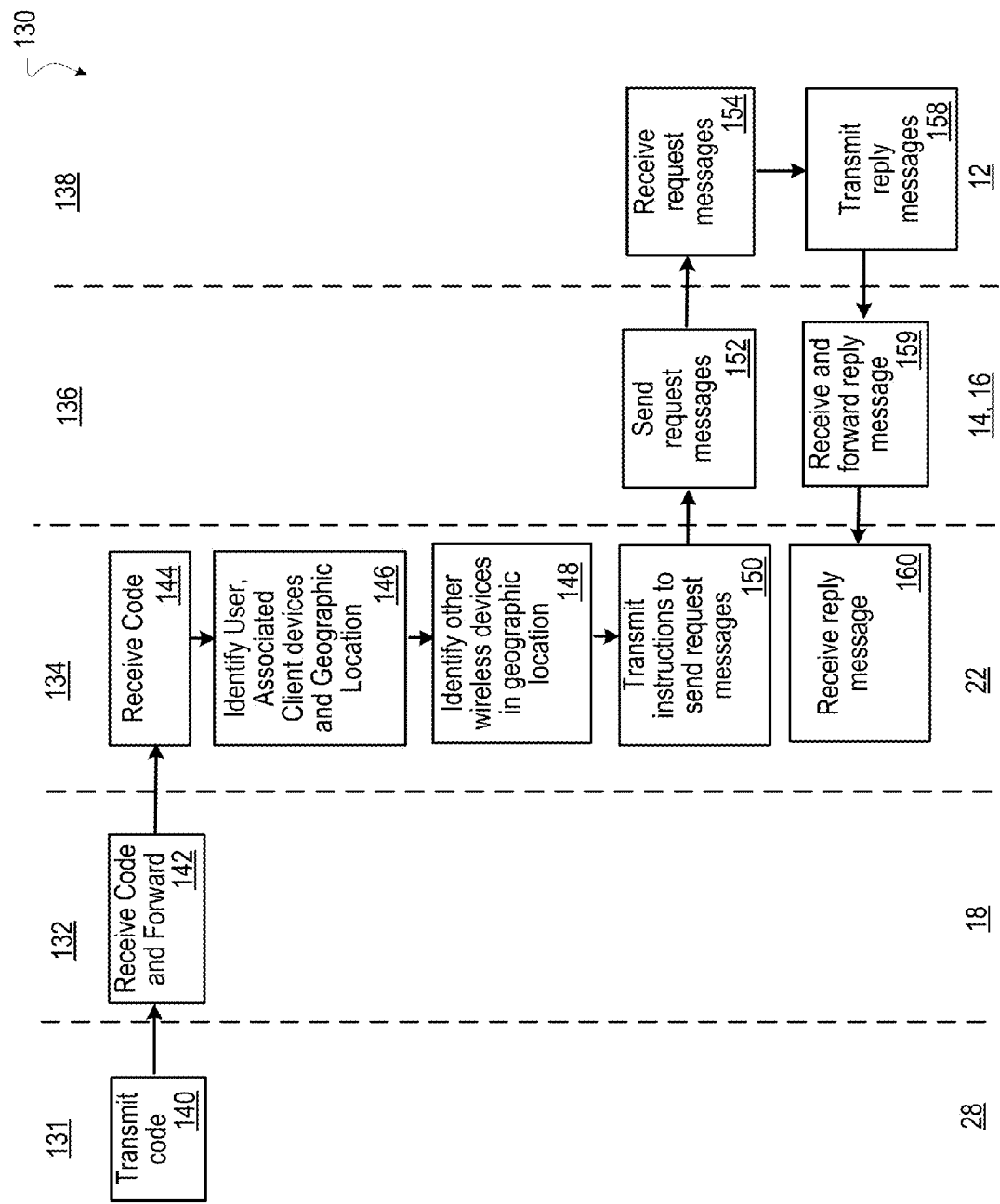
FIGS. 5-6 are flow diagrams of a process for verifying that wireless transmitter articles are in proximity to registered devices.

Referring to FIG. 5, process 130 is performed in tracking user locations. Process 130 includes portion 131, which is implemented by wireless transmitter article 28, portion 132, which is implemented by wireless device 18, portion 134, which is implemented by system 22, portion 136, which is implemented by wireless devices 14, 16 and portion 138, which is implemented by client device 12. In operation, wireless transmitter article 28 transmits (140) a code (e.g., a NFC code) to wireless device 18 (e.g., a scanner or a reader). Wireless device 18 receives (142) the code and forwards the code to system 22. In response, system 22 receives (144) the code. Based on the code, system 22 identifies (146) a user associated with the received code, client devices associated with the identifier user and a geographic location of the user. System 22 identifies the user associated with the received code by identifying a user profile that include the received code. From the user profile, system 22 identifies client devices that are registered to or otherwise associated with the user. System 22 identifies the geographic location by looking-up a geographic location of wireless device 18 that read the code. System 22 also identifies (148) other wireless devices (such as client device 12) that are located in the geographic location of the user, i.e., by looking-up which fixed location tracking devices are in proximity to wireless device 18 or by looking-up which other client devices (of the tracked user or of other users) are in proximity to wireless device 18. As previously described, client devices of users include applications (such as a GPS application) that intermittently transmit to system 22 information specifying a geographic location of the devices.

System 22 transmits (150) instructions to send request messages to wireless devices 14, 16 and/or to client devices that are in proximity to wireless device 18. In response, wireless devices 14, 16 send (152) request messages to client device 12. Client device 12 receives (154) the request message and transmits (158) reply messages. Wireless devices 14, 16 receive (158) the reply messages and forward them to system 22. In response, system 22 receives (159) the reply message and uses the contents of the reply messages to triangulate a position of client device 12 to determine if client device 12 is in proximity to the user being tracked.

In a variation, client device 12 includes a global positioning system (GPS) that transmits to system 22 information indicative of the geographic location of client device 12. However, triangulation provides an increased amount of granularity and specificity in identifying a geographic location.

In another variation, wireless devices 14, 16 are routers. In this example, system 22 identifies a geographic location of the wireless tracking device that transmitted the user identifier; performs a look-up of a client device of the user; identifies first and second wireless routers that are positioned in the identified geographic location; transmits, to the first router, a first request message to transmit to the client device of the user; transmits to the second router, a second request message to transmit to the client device; receives from the first and second routers, reply messages transmitted by the client device; based on contents of the reply messages, determines a geographic location of the client device; and verifies, based on the geographic location of the client device and the geographic location of the reader that the user is in proximity to the client device.

Figure 6:
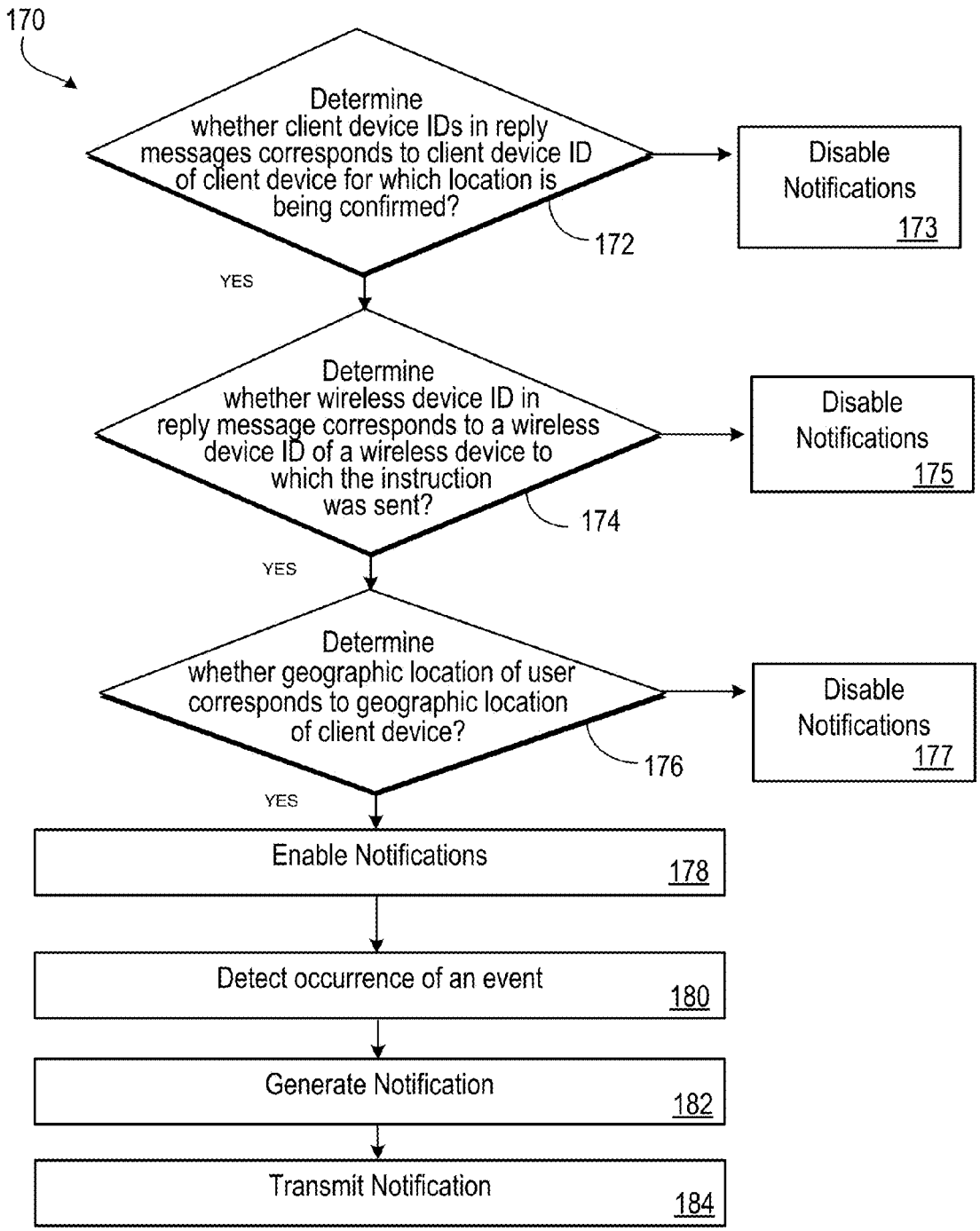

Referring to FIG. 6, system 22 performs process 170 in transmitting notifications to various client devices. In operation, system 22 determines (172) whether client device IDs included in reply messages corresponds to (e.g., matches) to a client device ID of a client device who location is being confirmed (i.e., client device 12). A reply message includes a client device ID of the device that transmitted the reply message. In response to the request messages, system 22 receives reply messages from many different client devices. To determine whether user 26 is in proximity to client device 12, system 22 is only interested in analyzing reply messages from client device 12 (i.e., reply messages with a device ID matching the device ID for client device 12). If system 22 is unable to detect the client device ID for client device 22 in any of the received reply messages, system 22 disables (173) notifications, because system 22 has been unable to confirm that user 26 is in proximity to client device 12 and is therefore unlikely to be able to view notifications that are sent to client device 12.

From among the reply messages with matching client device IDs, system determines (174) whether any of these messages have a wireless device ID corresponding to wireless device IDs of wireless devices to which system 22 sent the instructions. Even if system 22 receives messages from client device 12, system 22 is only interested in those messages if they are indicative of client device 12 being in proximity to user 26. These reply messages are indicative of client device 12 being in proximity to user 26, when the reply messages are routed through wireless devices that are known to be in proximity to the reader that read the NFC code of user 26. If system 22 is unable to identify reply messages having a wireless device ID corresponding to one or more wireless device IDs of one or more wireless devices to which system 22 sent the instructions, system 22 disables (175) notifications, because system 22 has been unable to confirm that user 26 is in proximity to client device 12 and is therefore unlikely to be able to view notifications that are sent to client device 12.

If system 22 is able to identify reply messages having a wireless device ID corresponding to one or more wireless device IDs of one or more wireless devices to which system 22 sent the instructions, system 22 determines (176) whether the geographic location of the user corresponds to the geographic location of the client device, by looking-up a geographic location of the wireless device associated with the wireless device ID. System 22 compares the geographic location of the wireless device to the previously identified geographic location of the user. When there is a mismatch (or lack of correspondence) between geographic locations, system 22 disables (177) notifications, because system 22 has been unable to confirm that user 26 is in proximity to client device 12 and is therefore unlikely to be able to view notifications that are sent to client device 12.

When there is a match (or correspondence) between geographic locations, system 22 enables (178) notifications (e.g., by activating rules engine 22*a*). System 22 detects (180) an occurrence of an event, such as a fire alarm, a power anomaly, and so forth. System 22 detects the event by receiving information indicative of the event from one or more sensors (in communication with system 22) or from a monitoring system that passes event information back to system 22. In response to the detected occurrence of the event, system 22 generates (182) a notification (such as a message) of the event. System 22 transmits (184) the notification to client device 12, i.e., the client device that is determined to be in proximity to the user.

Example Use Cases

In an example, employees, associates and people within a campus or building agree to have a subcutaneous transponder inserted in their body or agree to otherwise carry a transponder or have a transponder associated with him/her. Throughout the campus and buildings within the campus, a number of locations exist where tracking devices (such as readers or scanners) communicate with the transponder to capture the exact location of each person. For example, person A has his/her transponder tracked (via system 22) in a conference room B-4 or in building zero. There are various other types of tracking devices, such as Wi-Fi distribution nodes, personal computers in conference rooms, company issued computers using Bluetooth® or Wi-Fi, or NFC. Using a combination of at least three of these tracking devices, system 22 computes (via triangulation) a precise geographic location of the user (such as the exact floor, room, hallway, bathroom stall a person is in, and so forth. Other types of tracking devices include personal or company issued Ipads, personal computers (PCs), phones or other personal devices such as a FitBit. In this example, wireless device 18, client device 12 and wireless device 14 are each tracking devices that are NFC enabled to read NFC codes from NFC strips. As NFC strip 28 enters communication range of one or more of wireless device 18, client device 12 and wireless device 14, each of these wireless devices are configured to send to system 22 messages including the NFC code and the information indicative of the geographic location the wireless device (e.g., the tracking device) that is sending the NFC code. Using these messages, system 22 calculates (with a high level of granularity) the geographic location of wireless transmitter article 28 and hence user 26.

In still another example, system 22 uses a company issued ID badge of the person as an identifier. In this example, the company issued ID badge includes a wireless transmitter to transmit an encoded code or otherwise encodes the code. System 22 also specifies additional controls to confirm the geographic location of the individual. These additional controls include that the person's badge is near his/her phone and computer or with his/her IPad, or that they passed through security into the campus or building but did not leave it.

In yet another example, clothing includes flash memory that is used by system 22 in measuring surroundings. In this example, clothes are manufactured with a seam, cuff or sewn in a strip of material that includes NFC information, e.g., via a NFC strip. The person's clothing is the tracked device and is programmable. For people who work in a factory and that wear company issue smocks, system 22 requires a programmed set of identifiers (such as a code) in the strip of material that communicates via NFC. Via the programmed set of identifies, system 22 tracks how long they are at their station or if they are even in the building in case of fire. System 22 does this by receiving messages from various tracking devices that specify a location of the tracking device and performing triangulation to identify a location of the person. In this example, client devices (such as mobile devices and laptops) are preconfigured to be NFC or Bluetooth® readers (along with location enabled via GPS or other location tracking technology), to enable these devices to pass back to system 22 information specifying which NFC code was read and a geographic location from which the NFC code was read.

Using the techniques described herein, system 22 is used to detect power anomalies and to notify users of these detected anomalies. System 22 also detects or receives notification of fire alarms. Not all users are able to see or hear these fire alarms. Using the techniques described herein, system 22 identifies which users are in a particular geographic location (such as a zone) with a fire alarm and send an alert to the users' phone, Ipad, etc. or cause the users' fitbit to vibrate.

In the case of power anomalies, if many occur in a building at once, there is little way to determine how to prioritize. By tracking people in the building, system 22 perform analysis on how to prioritize quickly. For example, if the board of directors are all located in Building 2, Room 123, system 22 ensures that this room gets its power restored first, by generating a prioritized queue of notifications or work orders and prioritizing work orders for this room at the top.

There are many applications of NFC or Bluetooth® strips to provide an increased amount of granularity in location identification. For example, firefighters have NFC or Bluetooth® strips in their helmets and jackets that are used by system 22 to more finely track them than a GPS transponder. This can be done by having devices (such as scanners and other readers) on the trucks and other firefighters.

In still another example, sub-contractors are tracked using the techniques described herein. Construction or maintenance workers are tracked to ensure that they are actually on site and on the area they should be. Via a company issued id or vest with an inserted NFC or Bluetooth® strip, system 22 tracks their locations.

System 22 also tracks work goods by inserting a NFC strip on the work goods, e.g., placing a NFC strip on a bag or packet of coffee. If the work good leaves the premises, system 22 tracks the location of the work good to identify potential theft. In addition to the tracking devices described herein, tracking strips (such as NFC strips) can also be inserted in various other objects, such as a tooth cap, necklace, bracelet, ring, personal or work phone, and so forth.

Figure 7:
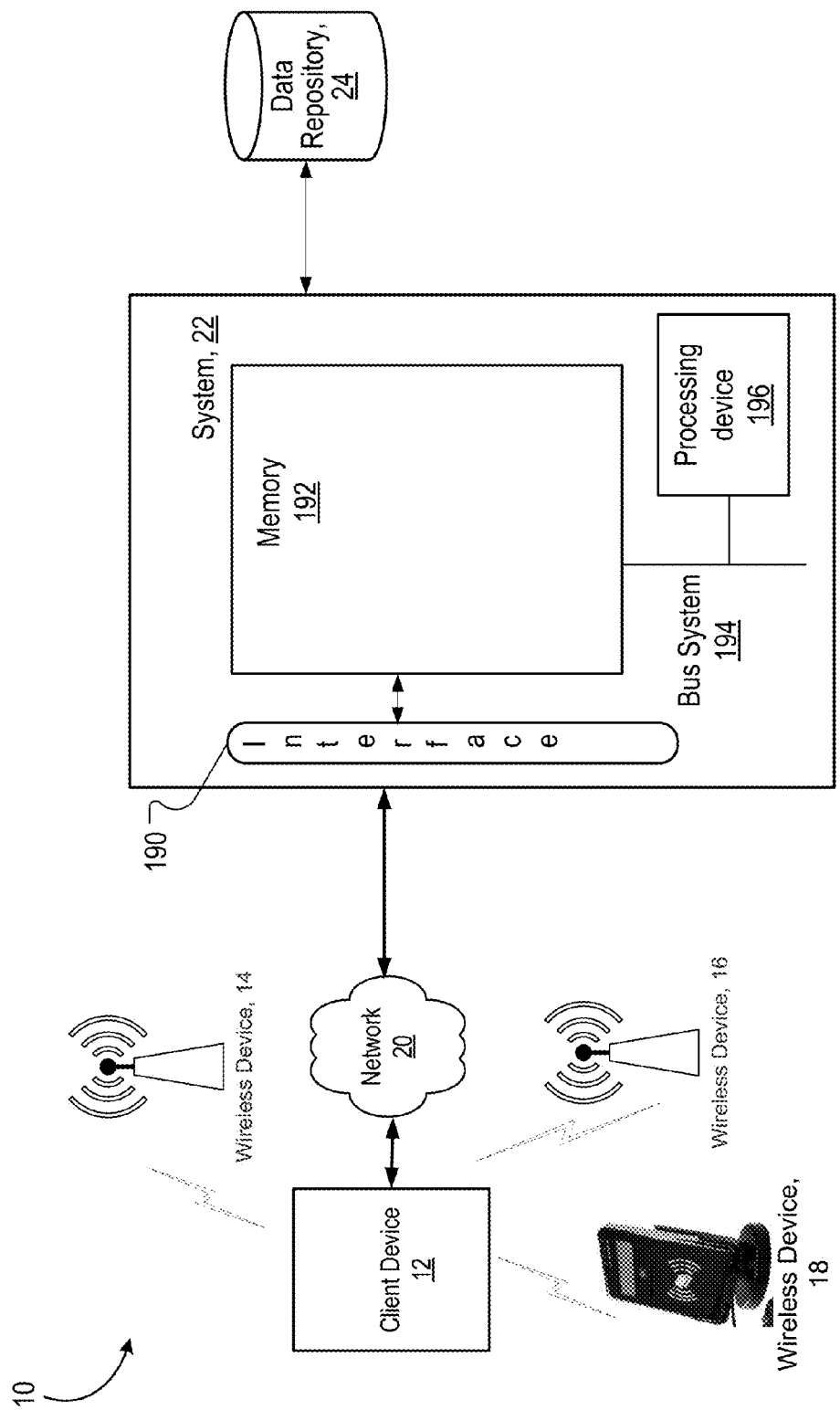
FIG. 7 is a block diagram of components of the system for verifying that wireless transmitter articles are in proximity to registered devices.

FIG. 7 is a block diagram showing examples of components of network system 10. Client device 12 can be any sort of computing device capable of taking input from a user and communicating over network 20 with system 22 and/or with other client devices. Client device 12 can be a mobile device, a desktop computer, a laptop, a cell phone, a personal digital assistant ("PDA"), a server, an embedded computing system, a mobile device and so forth.

System 22 can be a variety of computing devices capable of receiving data and running one or more services. In an example, system 22 can include a server, a distributed computing system, a desktop computer, a laptop, a cell phone, a rack-mounted server, and the like. System 22 can be a single server or a group of servers that are at a same position or at different positions (i.e., locations). System and client device 12 can run programs having a client-server relationship to each other. Although distinct modules are shown in the figures, in some examples, client and server programs can run on the same device.

System 22 can receive data from wireless devices 14, 16, 18 and/or client device 12 through input/output (I/O) interface 190. I/O interface 190 can be a type of interface capable of receiving data over a network, including, e.g., an Ethernet interface, a wireless networking interface, a fiber-optic networking interface, a modem, and so forth. System 22 also includes a processing device 196 and memory 192. A bus system 194, including, for example, a data bus and a motherboard, can be used to establish and to control data communication between the components of system 22.

Processing device 196 can include one or more microprocessors. Generally, processing device 196 can include an appropriate processor and/or logic that is capable of receiving and storing data, and of communicating over a network (not shown). Memory 192 can include a hard drive and a random access memory storage device, including, e.g., a dynamic random access memory, or other types of non-transitory machine-readable storage devices. Memory 192 stores computer programs that are executable by processing device 196. These computer programs may include a data engine (not shown) for implementing the operations and/or the techniques described herein. The data engine can be implemented in software running on a computer device, hardware or a combination of software and hardware.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by a processing device. A machine-readable medium can be a machine-readable storage device, a machine-readable storage substrate, a random or serial access memory device, or a combination of one or more of them.

The term "processing device" encompasses all kinds of apparatus, devices, and machines for processing information, including by way of example a programmable processor, a computer, or multiple processors or computers. The apparatus can include special purpose logic circuitry, e.g., an FPGA (field programmable gate array) or an ASIC (application-specific integrated circuit) or RISC (reduced instruction set circuit). The apparatus can also include, in addition to hardware, code that creates an execution environment for the computer program in question, e.g., code that constitutes processor firmware, a protocol stack, an information base management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or information (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input information and generating output. The processes and logic flows can also be performed by, and apparatus can also be implemented as, special purpose logic circuitry, e.g., an FPGA (field programmable gate array) or an ASIC (application-specific integrated circuit) or RISC.

Computers suitable for the execution of a computer program include, by way of example, general or special purpose microprocessors or both, or any other kind of central processing unit. Generally, a central processing unit will receive instructions and information from a read-only memory or a random access memory or both. The essential elements of a computer are a central processing unit for performing or executing instructions and one or more memory devices for storing instructions and information. Generally, a computer will also include, or be operatively coupled to receive information from or transfer information to, or both, one or more mass storage devices for storing information, e.g., magnetic, magneto-optical disks, or optical disks. However, a computer need not have such devices. Moreover, a computer can be embedded in another device, e.g., a mobile telephone, a smartphone or a tablet, a touch-screen device or surface, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and information include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and (Blue Ray) DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as an information server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital information communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In another example, the server can be in the cloud via cloud computing services.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving by one or more computing systems a user identifier from a wireless tracking device that reads a user identifier article in proximity to the wireless tracking device;
   identifying by the one or more computers a geographic location of the wireless tracking device that transmitted the user identifier;
   performing by the one or more computers a look-up of a client device of the user;
   identifying by the one or more computers first and second wireless routers that are positioned in the identified geographic location;
   transmitting, by the one or more computing systems to the first router, a first request message to transmit to the client device of the user; and
   to the second router, a second request message to transmit to the client device;
   determining, by the one or more computers whether reply messages transmitted by the client device were received from the first and second routers;
   determining based on the reply messages a geographic location of the client device; and verifying, based on the geographic location of the client device and the geographic location of the wireless tracking device that the user is in proximity to the client device.

2. The computer-implemented method of claim 1 wherein an absence of receipt of the reply messages indicates that the client device is not in a communication range of the first and second routers; and based on the absence of receipt of the reply messages,
determining by the one or more computers that the user and the client device are in different geographic locations.

3. The computer-implemented method of claim 1, wherein determining further comprises:
performing a triangulation process to determine the geographic location of the client device.

4. The computer-implemented method of claim 1, further comprising:
notifying the user of an occurrence of an event in a geographic location of the wireless tracking device or the client device by transmitting to the client device a message with information indicative of the event.

5. The computer-implemented method of claim 1, further comprising:
comparing the geographic location of the client device to the geographic location of the wireless tracking device; and
determining, based on the comparing, a correspondence between the geographic locations.

6. The computer-implemented method of claim 1, wherein the user identifier is a near-field communication (NFC) code, and wherein the method further comprises:
registering the NFC code with the one or more computer systems;
associating the NFC code with a personal profile of the user to enable identification of the user via the NFC code.

7. The computer-implemented method of claim 1, further comprising:
retrieving, from a data repository, personal profile information for the user; and
generating information for a graphical user interface that when rendered on a display device renders a visual representation of a geographic location of the user and at least a portion of the personal profile information.

8. The computer-implemented method of claim 1, further comprising:
receiving a notice of an event having occurred in a particular geographic location, with the geographic location comprising a plurality of different areas;
determining, based on received first user identifiers, one or more first users who are located in a first area of the particular geographic location;
determining, based on received second user identifiers, one or more second users who are located in a second area of the particular geographic location;
determining that the one or more first users are a high priority than the one or more second users, at least partially based on the one or more first users being a particular user type or based on the first area in which the one or more first users are located;
generating a queue in which information representing the one or more first users is ranked above information representing the one or more second users; and
performing one or more actions related to the first and second users, with an order in which the actions are performed being in accordance with a ranking of the first and second users specified by the queue.

9. The computer-implemented method of claim 1, further comprising:
determining, based on received user identifiers, a number of users in a particular location; and
computing, based on the received number of users, a utilization metric for the particular location.

10. The computer-implemented method of claim 1, wherein the particular location is a conference room in a building and wherein the utilization metric specifies an appropriate temperature for the conference room to ensure the users utilize an appropriate amount of air conditioning.

11. One or more non-transitory machine-readable hardware storage devices storing instructions that are executable by one or more processing devices to perform operations comprising:
receiving a user identifier from a wireless tracking device that reads a user identifier article in proximity to the wireless tracking device;
identifying a geographic location of the wireless tracking device that transmitted the user identifier;
performing a look-up of a client device of the user;
identifying first and second wireless routers that are positioned in the identified geographic location;
transmitting, to the first router, a first request message to transmit to the client device of the user;
transmitting, to the second router, a second request message to transmit to the client device;
determining whether the reply messages transmitted by the client device were received from the first and second routers;
based on contents of the reply messages, determining a geographic location of the client device; and
verifying, based on the geographic location of the client device and the geographic location of the wireless tracking device that the user is in proximity to the client device.

12. The one or more machine-readable hardware storage devices of claim 11, wherein an absence of receipt of the reply messages indicate that
the client device is not in a communication range of the first and second routers; and based on the absence of receipt of the reply messages,
determining that the user and the client device are in different geographic locations.

13. The one or more machine-readable hardware storage devices of claim 11, wherein determining further comprises:
performing a triangulation process to determine the geographic location of the client device.

14. The one or more machine-readable hardware storage devices of claim 11, wherein the operations further comprise:
notifying the user of an occurrence of an event in a geographic location of the wireless tracking device or the client device by transmitting to the client device a message with information indicative of the event.

15. The one or more machine-readable hardware storage devices of claim 11, wherein the operations further comprise:
comparing the geographic location of the client device to the geographic location of the wireless tracking device; and
determining, based on the comparing, a correspondence between the geographic locations.

16. The one or more machine-readable hardware storage devices of claim 11, wherein the user identifier is a near-field communication (NFC) code, and wherein the method further comprises:
   registering the NFC code with one or more computer systems;
   associating the NFC code with a personal profile of the user to enable identification of the user via the NFC code.

17. The one or more machine-readable hardware storage devices of claim 11, wherein the operations further comprise:
   retrieving, from a data repository, personal profile information for the user; and
   generating information for a graphical user interface that when rendered on a display device renders a visual representation of a geographic location of the user and at least a portion of the personal profile information.

18. The one or more machine-readable hardware storage devices of claim 11, wherein the operations further comprise:
   receiving a notice of an event having occurred in a particular geographic location, with the geographic location comprising a plurality of different areas;
   determining, based on received first user identifiers, one or more first users who are located in a first area of the particular geographic location;
   determining, based on received second user identifiers, one or more second users who are located in a second area of the particular geographic location;
   determining that the one or more first users are a high priority than the one or more second users, at least partially based on the one or more first users being a particular user type or based on the first area in which the one or more first users are located;
   generating a queue in which information representing the one or more first users is ranked above information representing the one or more second users; and
   performing one or more actions related to the first and second users, with an order in which the actions are performed being in accordance with a ranking of the first and second users specified by the queue.

19. The one or more machine-readable hardware storage devices of claim 11, wherein the operations further comprise:
   determining, based on received user identifiers, a number of users in a particular location; and
   computing, based on the received number of users, a utilization metric for the particular location.

20. The one or more machine-readable hardware storage devices of claim 11, wherein the particular location is a conference room in a building and wherein the utilization metric specifies an appropriate temperature for the conference room to ensure the users utilize an appropriate amount of air conditioning.

21. The one or more machine-readable hardware storage devices of claim 11, wherein the one or more machine-readable hardware storage devices are selected from the group including storage devices and random access memory devices.

22. An electronic system comprising:
   one or more processor devices; and
   one or more machine-readable hardware storage devices storing instructions that are executable by the one or more processing devices to cause the processor to:
   receive a user identifier from a wireless tracking device that reads a user identifier article in proximity to the wireless tracking device;
   identify a geographic location of the wireless tracking device that transmitted the user identifier;
   perform a look-up of a client device of the user;
   identify first and second wireless routers that are positioned in the identified geographic location;
   transmit to the first router, a first request message to transmit to the client device of the user;
   transmit to the second router, a second request message to transmit to the client device;
   determine whether reply messages transmitted by the client device were received from the first and second routers;
   determine based on the reply messages a geographic location of the client device; and
   verify based on the geographic location of the client device and the geographic location of the wireless tracking device that the user is in proximity to the client device.

23. The system of claim 22 wherein an absence of receipt of the reply messages indicates that the client device is not in a communication range of the first and second routers; and based on the absence of receipt of the reply messages, the instructions further cause the processor to:
   determine that the user and the client device are in different geographic locations.

24. The system of claim 22 wherein the instructions further cause the processor to:
   perform a triangulation process to determine the geographic location of the client device.

25. The system of claim 22 wherein the instructions further cause the processor to:
   notify the user of an occurrence of an event in a geographic location of the wireless tracking device or the client device by transmitting to the client device a message with information indicative of the event.

* * * * *